US012562288B2

(12) United States Patent
Kobayashi et al.

(10) Patent No.: US 12,562,288 B2
(45) Date of Patent: Feb. 24, 2026

(54) NUCLEAR REACTOR

(71) Applicant: MITSUBISHI HEAVY INDUSTRIES, LTD., Tokyo (JP)

(72) Inventors: Shota Kobayashi, Tokyo (JP); Satoru Kamohara, Tokyo (JP); Yasutaka Harai, Tokyo (JP); Tadakatsu Yodo, Tokyo (JP); Shohei Otsuki, Tokyo (JP); Nozomu Murakami, Tokyo (JP); Wataru Nakazato, Tokyo (JP); Takashi Hasegawa, Tokyo (JP); Yutaka Tanaka, Tokyo (JP); Tatsuo Ishiguro, Tokyo (JP); Hironori Noguchi, Tokyo (JP); Hideyuki Kudo, Tokyo (JP); Takafumi Noda, Tokyo (JP); Kazuhiro Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 322 days.

(21) Appl. No.: 18/026,007

(22) PCT Filed: Sep. 15, 2021

(86) PCT No.: PCT/JP2021/033941
§ 371 (c)(1),
(2) Date: Mar. 13, 2023

(87) PCT Pub. No.: WO2022/075023
PCT Pub. Date: Apr. 14, 2022

(65) Prior Publication Data
US 2024/0013938 A1 Jan. 11, 2024

(30) Foreign Application Priority Data
Oct. 7, 2020 (JP) ................................ 2020-169941

(51) Int. Cl.
*G21C 3/36* (2006.01)
*G21C 3/16* (2006.01)
(Continued)

(52) U.S. Cl.
CPC ............... *G21C 3/16* (2013.01); *G21C 3/326* (2013.01); *G21C 5/06* (2013.01); *G21C 3/36* (2013.01)

(58) Field of Classification Search
CPC .................................... G21C 3/16; G21C 3/36
See application file for complete search history.

(56) References Cited

U.S. PATENT DOCUMENTS 3,104,217 A 9/1963 Long
3,243,613 A 3/1966 Grover
(Continued)

FOREIGN PATENT DOCUMENTS

CN 109147966 A 1/2019
CN 109585041 A * 4/2019 ............... G21C 7/12
(Continued)

OTHER PUBLICATIONS

Non-Final Office Action dated Dec. 18, 2024, issued in U.S. Appl. No. 17/424,543. (13 pages).
(Continued)

*Primary Examiner* — Lily C Garner
(74) *Attorney, Agent, or Firm* — WHDA, LLP

(57) ABSTRACT

An object is to change reactor core thermal output. A nuclear reactor includes an annular fuel layer and a heat conductive layer stacked on the fuel layer and extending around a periphery of the fuel layer.

8 Claims, 9 Drawing Sheets

(51) Int. Cl.
*G21C 3/326* (2006.01)
*G21C 5/06* (2006.01)

(56) References Cited

U.S. PATENT DOCUMENTS

| | | | | |
|---|---|---|---|---|
| 3,462,345 | A * | 8/1969 | Jabsen | G21C 7/16 376/233 |
| 4,129,477 | A * | 12/1978 | Johansson | G21C 3/16 376/429 |
| 5,112,571 | A | 5/1992 | Orii et al. | |
| 6,862,331 | B2 | 3/2005 | Kato et al. | |
| 11,923,098 | B2 * | 3/2024 | Howe | G21C 5/18 |
| 2009/0252283 | A1 | 10/2009 | Ahlfeld et al. | |
| 2010/0208862 | A1 | 8/2010 | Lorenzo et al. | |
| 2016/0027536 | A1 | 1/2016 | Mcclure et al. | |
| 2017/0221590 | A1 | 8/2017 | Bjork et al. | |
| 2018/0033501 | A1 | 2/2018 | Kimura et al. | |
| 2018/0268950 | A1 | 9/2018 | Mckellar | |
| 2019/0096536 | A1 | 3/2019 | Arafat et al. | |
| 2019/0108920 | A1 | 4/2019 | Howe et al. | |
| 2020/0126680 | A1 | 4/2020 | Kim et al. | |
| 2021/0125735 | A1 | 4/2021 | Mariani et al. | |
| 2021/0125737 | A1 | 4/2021 | Botha et al. | |
| 2022/0399135 | A1 | 12/2022 | Morris | |
| 2023/0036331 | A1 | 2/2023 | Lahoda et al. | |

FOREIGN PATENT DOCUMENTS

| | | | | | |
|---|---|---|---|---|---|
| CN | 112002441 | A | * | 11/2020 | G21C 15/18 |
| FR | 3122026 | A1 | * | 10/2022 | G21C 3/20 |
| JP | S62-017689 | A | | 1/1987 | |
| JP | 02198391 | A | * | 8/1990 | |
| JP | H02-285286 | A | | 11/1990 | |
| JP | H05-045485 | A | | 2/1993 | |
| JP | 2551892 | B2 | | 11/1996 | |
| JP | 2000284084 | A | * | 10/2000 | |
| JP | 2004-294250 | A | | 10/2004 | |
| JP | 2014-119429 | A | | 6/2014 | |
| JP | 2017-181445 | A | | 10/2017 | |
| JP | 2017-534864 | A | | 11/2017 | |
| JP | 2019-196886 | A | | 11/2019 | |
| KR | 100999839 | B1 | | 12/2010 | |
| KR | 101183237 | B1 | | 9/2012 | |
| WO | WO-2016197807 | A1 | * | 12/2016 | G21C 3/16 |

OTHER PUBLICATIONS

Written Opinion dated Dec. 14, 2021, issued in counterpart Application No. PCT/JP2021/033941, with English Translation. (12 pages).

International Search Report dated Dec. 22, 2020, issued in application No. PCT/JP2020/041587, English translation (counterpart to U.S. Appl. No. 17/424,543). (6 pages).

Written Opinion dated Dec. 22, 2020, issued in application No. PCT/JP2020/041587, with English translation (counterpart to U.S. Appl. No. 17/424,543). (15 pages).

Office Action dated Aug. 22, 2023, issued in JP application No. 2020-033418, with English translation (counterpart to U.S. Appl. No. 17/424,543). (9 pages).

Written Opinion dated Dec. 21, 2021, issued in Application No. PCT/JP2021/034615, with English translation (counterpart to U.S. Appl. No. 18/031,766). (7 pages).

International Search Report dated Dec. 21, 2021, issued in Application No. PCT/JP/2021/034615 (counterpart to U.S. Appl. No. 18/031,766). (5 pages).

Election of Species Requirement dated May 15, 2023, issued in U.S. Appl. No. 17/424,543. (9 pages).

Non-Final Office Action dated Sep. 29, 2023, issued in U.S. Appl. No. 17/424,543. (22 pages).

Final Office Action dated Sep. 11, 2024, issued in U.S. Appl. No. 17/424,543. (17 pages).

Non-Final Office Action dated Nov. 6, 2025, issued in U.S. Appl. No. 17/424,543 (16 pages).

* cited by examiner

NUCLEAR REACTOR

FIELD

The present disclosure relates to a nuclear reactor.

BACKGROUND

Patent Literature 1 and 2 show structures in which a reactor core is formed in an annular shape, for example. The reactor core described in Patent Literature 1 includes an outer graphite cylinder, an inner graphite cylinder, and a fuel-filled region sectioned by these and filled with spherical fuel in a tubular shape. Patent Literature 1 describes a structure in which when heat is taken out from the reactor core, cooling gas is caused to flow in from the outside of the annular reactor core, to pass through the reactor core, and is caused to flow out of the inside of the annular reactor core. On the other hand, Patent Literature 2 describes a structure in which a number of fuel assemblies are bundled together and are placed in an annular shape as a whole. In addition, Patent Literature 2 is a structure in which there is a low-temperature coolant in a lower plenum at the lower part of the annular reactor core, and there is a high-temperature coolant in an upper plenum at the upper part thereof.

CITATION LIST

Patent Literature

Patent Literature 1: Japanese Patent Application Laid-open No. 2004-294250

Patent Literature 2: Japanese Patent No. 2551892

SUMMARY

Technical Problem

Given these circumstances, it is desired that in a design phase of a reactor core of a nuclear reactor, change of reactor core thermal output, including a structure of taking heat out of the reactor core, is easy.

An object of the present disclosure is to solve the above problem and to provide a nuclear reactor that can change reactor core thermal output.

Solution to Problem

To achieve the above-described object, a nuclear reactor according to one aspect of the present disclosure includes an annular fuel layer; and a heat conductive layer stacked on the fuel layer and extending around a periphery of the fuel layer.

Advantageous Effects of Invention

The present disclosure can change the reactor core thermal output by increasing or decreasing the number of fuel layers and heat conductive layers.

DESCRIPTION OF EMBODIMENTS

The following describes an embodiment according to the present disclosure in detail based on the accompanying drawings. This invention is not limited by this embodiment. The components in the following embodiment include a constituent element that is replaceable by those skilled in the art and is easy, or substantially the same constituent element.

Figure 1:
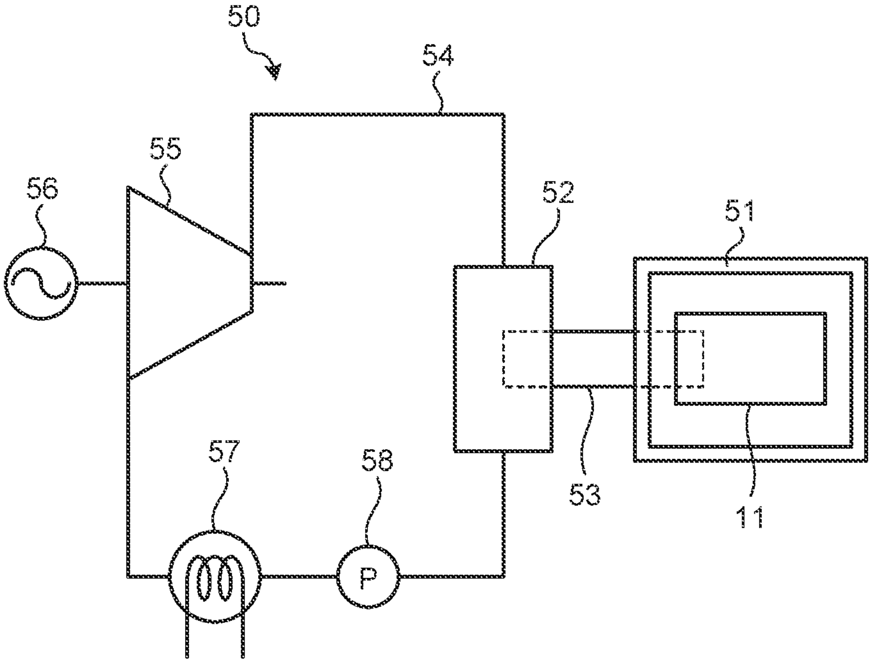
FIG. 1 is a schematic diagram of a nuclear power generation system including a nuclear reactor according to an embodiment.

FIG. 1 is a schematic diagram of a nuclear power generation system including a nuclear reactor according to the embodiment. As illustrated in FIG. 1, this nuclear power generation system 50 has a nuclear reactor vessel 51, a heat exchanger 52, a heat conductive part 53, a coolant circulating unit 54, a turbine 55, a power generator 56, a cooler 57, and a compressor 58.

The nuclear reactor vessel 51 has a nuclear reactor 11 of the present embodiment, which is described later. The nuclear reactor vessel 51 houses the nuclear reactor 11 thereinside. The nuclear reactor vessel 51 houses the nuclear reactor 11 in a hermetically sealed condition. The nuclear reactor vessel 51 is provided with an opening and closing part such as a lid so that the nuclear reactor 11 placed thereinside can be housed or taken out. The nuclear reactor vessel 51 can maintain its hermetically sealed condition even when a nuclear reaction occurs in the nuclear reactor 11 to make the inside high temperature and high pressure. The nuclear reactor vessel 51 is formed of a material having neutron beam blocking performance.

The heat exchanger 52 performs heat exchange with the nuclear reactor 11. The heat exchanger 52 of the present embodiment recovers the heat of the nuclear reactor 11 via a solid, highly heat conductive material of the heat conductive part 53 partially placed inside the nuclear reactor vessel 51. The heat conductive part 53 illustrated in FIG. 1 schematically illustrates a heat conductive part 3, which is described below.

The coolant circulating unit 54 is a path through which a coolant is circulated, in which the heat exchanger 52, the turbine 55, the cooler 57, and the compressor 58 are connected to each other. The coolant flowing through the coolant circulating unit 54 flows through the heat exchanger 52, the turbine 55, the cooler 57, and the compressor 58 in this order, and the coolant having passed through the compressor 58 is supplied to the heat exchanger 52. Consequently, the heat exchanger 52 performs heat exchange between the solid, highly heat conductive material of the heat conductive part 53 and the coolant flowing through the coolant circulating unit 54.

The coolant having passed through the heat exchanger 52 flows into the turbine 55. The turbine 55 is rotated by the energy of the heated coolant. In other words, the turbine 55 converts the energy of the coolant into rotational energy to absorb the energy from the coolant.

The power generator 56 is coupled to the turbine 55 and rotates integrally with the turbine 55. The power generator 56 rotates with the turbine 55 to perform power generation.

The cooler 57 cools the coolant having passed through the turbine 55. The cooler 57 is a chiller or a condenser or the like when the coolant is temporarily liquefied.

The compressor 58 is a pump pressurizing the coolant.

The nuclear power generation system 50 conducts heat generated through the reaction of nuclear fuel of the nuclear reactor 11 to the heat exchanger 52 by the heat conductive part 53. The nuclear power generation system 50 heats the coolant flowing through the coolant circulating unit 54 by the heat of the highly heat conductive material of the heat conductive part 53 in the heat exchanger 52. In other words, the coolant absorbs heat in the heat exchanger 52. The heat generated in the nuclear reactor 11 is thereby recovered by the coolant. The coolant is compressed by the compressor 58 and is then heated when passing through the heat exchanger 52 to rotate the turbine 55 by compressed and heated energy. The coolant is then cooled to a standard state by the cooler 57 and is again supplied to the compressor 58.

As described above, the nuclear power generation system 50 conducts the heat taken out of the nuclear reactor 11 to the coolant as a medium rotating the turbine 55 via the highly heat conductive material. The nuclear reactor 11 and the coolant as the medium rotating the turbine 55 can be thereby isolated from each other, and the risk of the medium rotating the turbine 55 being polluted can be reduced.

Figure 2:
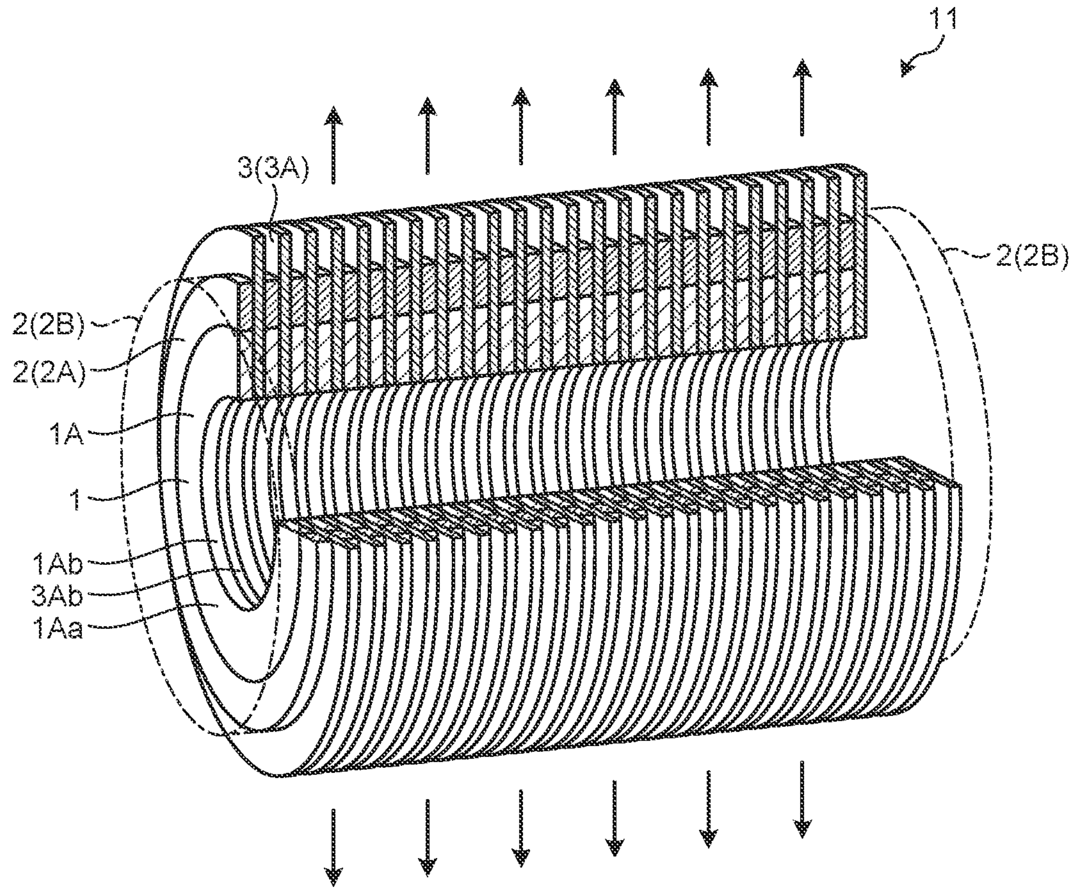
FIG. 2 is a partially cutaway schematic diagram of the nuclear reactor according to the embodiment.
Figure 3:
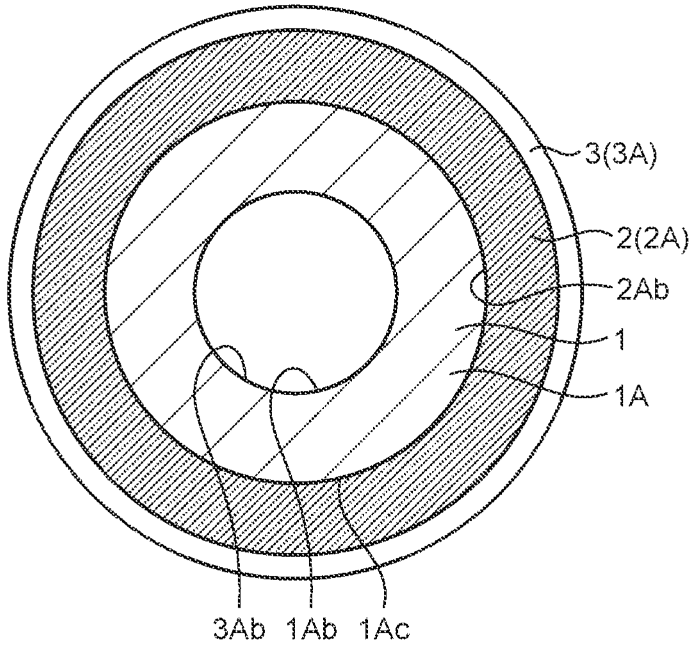
FIG. 3 is a sectional schematic diagram of the nuclear reactor according to the embodiment.
Figure 4:
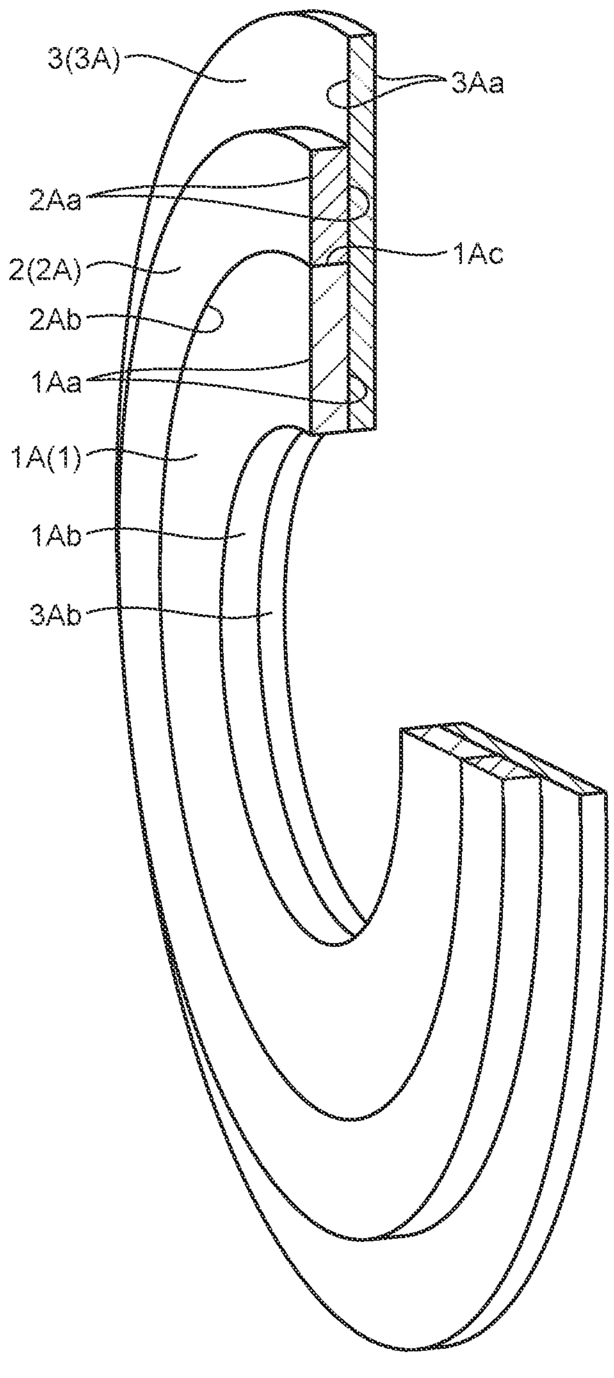
FIG. 4 is a partially cutaway enlarged schematic diagram of the nuclear reactor according to the embodiment.
Figure 5:
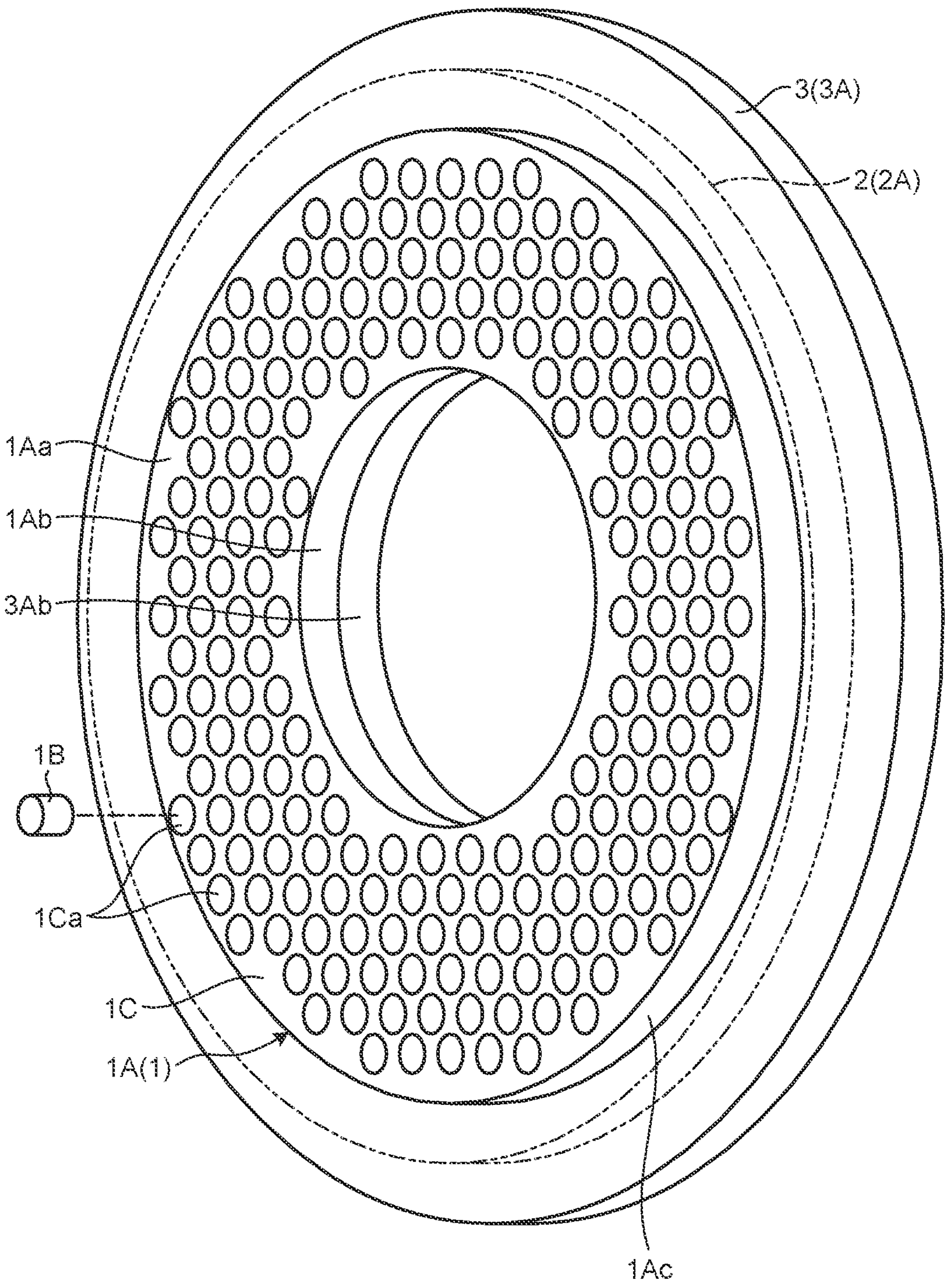
FIG. 5 is a partially cutaway enlarged schematic diagram of the nuclear reactor according to the embodiment.
Figure 6:
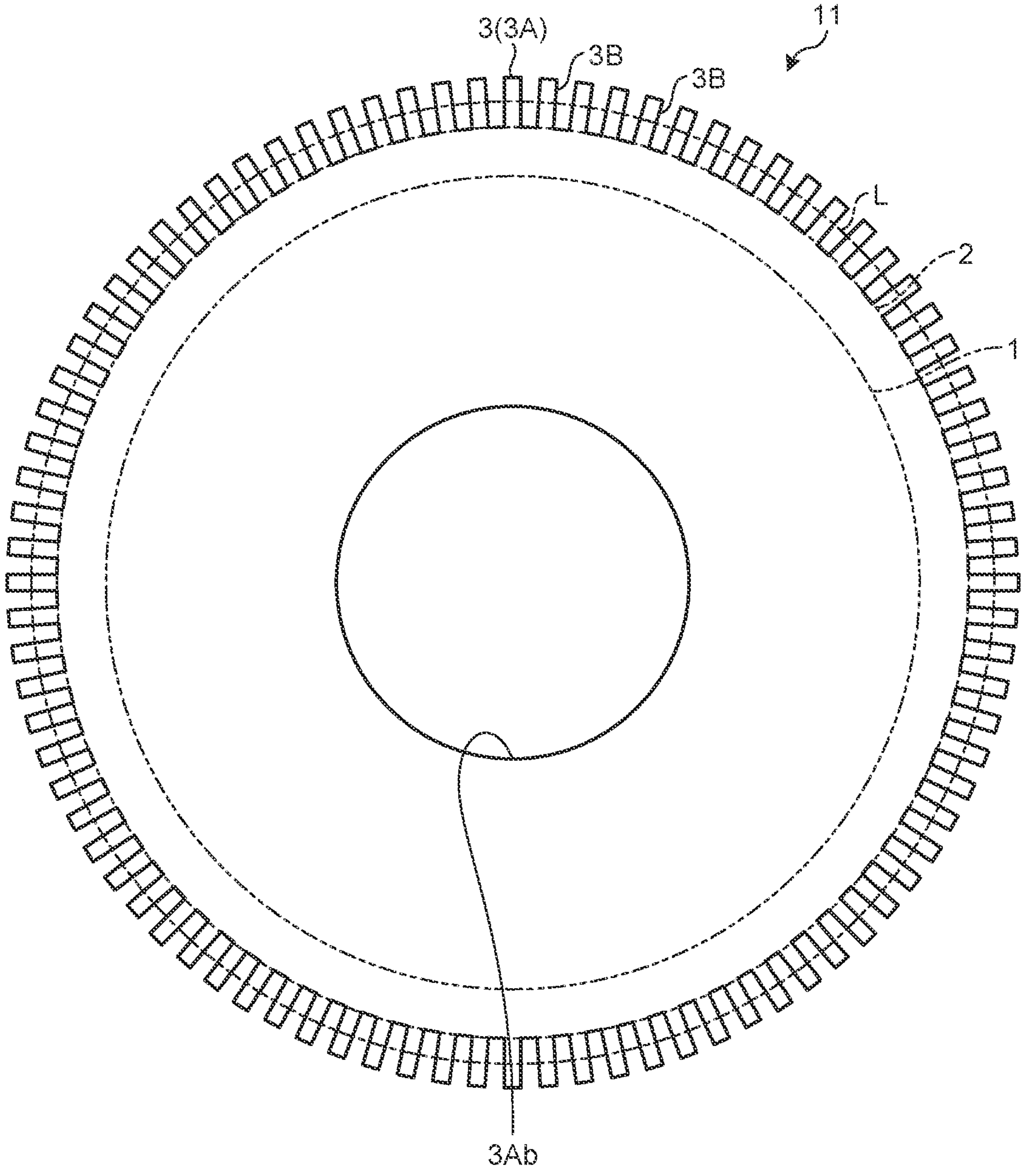
FIG. 6 is a partially cutaway enlarged schematic diagram of the nuclear reactor according to the embodiment.
Figure 7:
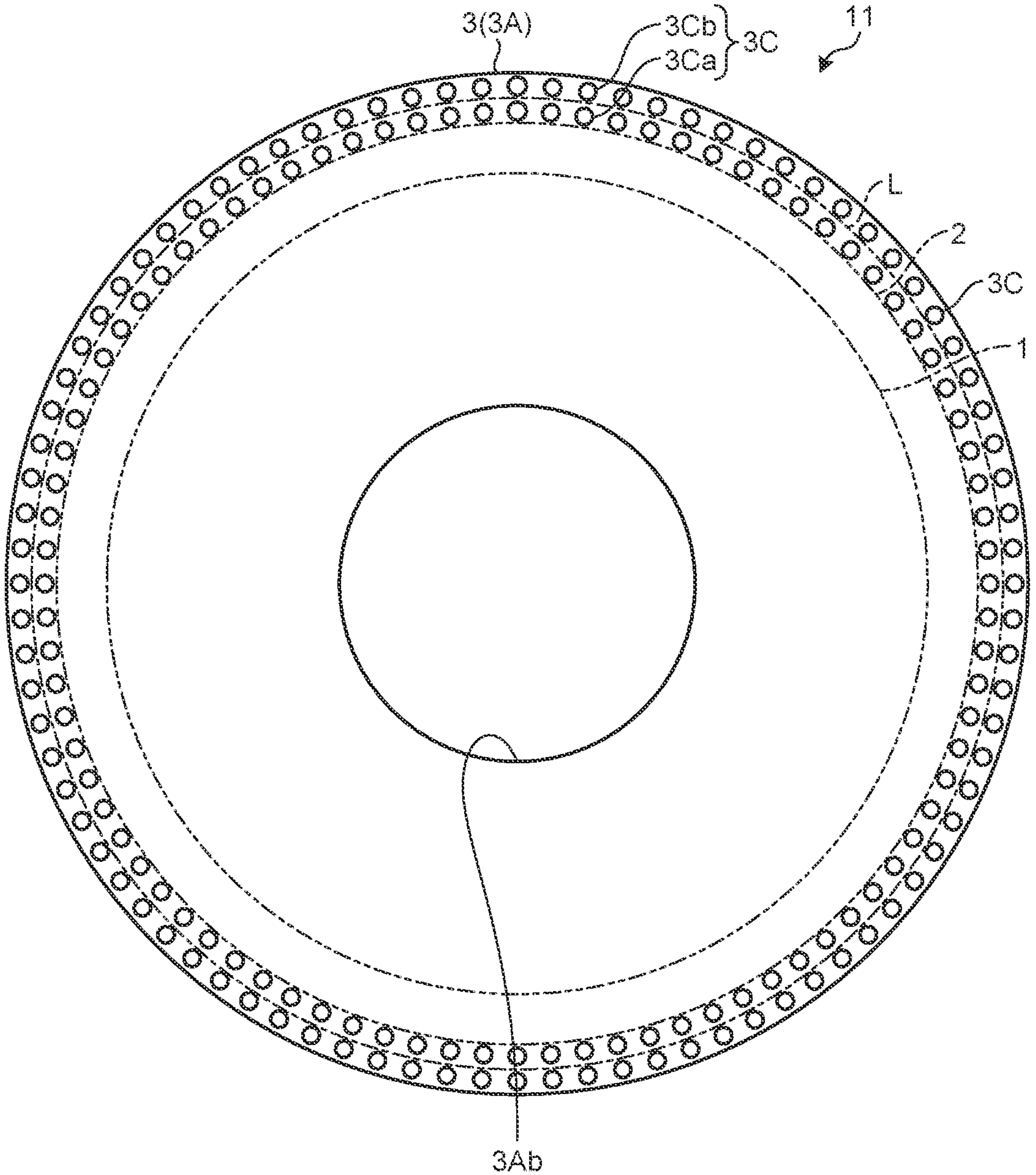
FIG. 7 is a partially cutaway enlarged schematic diagram of the nuclear reactor according to the embodiment.
Figure 8:
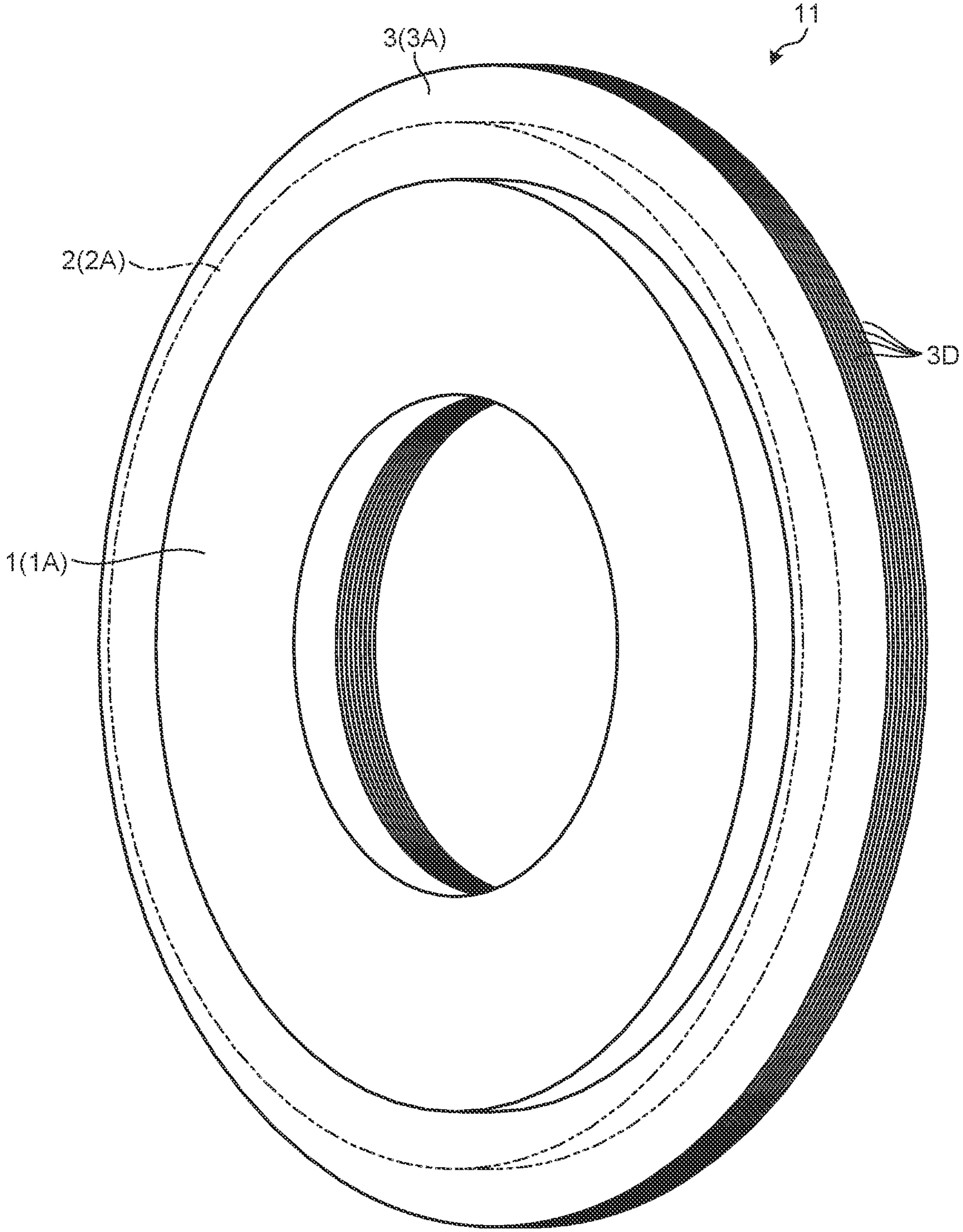
FIG. 8 is a partially cutaway enlarged schematic diagram of the nuclear reactor according to the embodiment.
Figure 9:
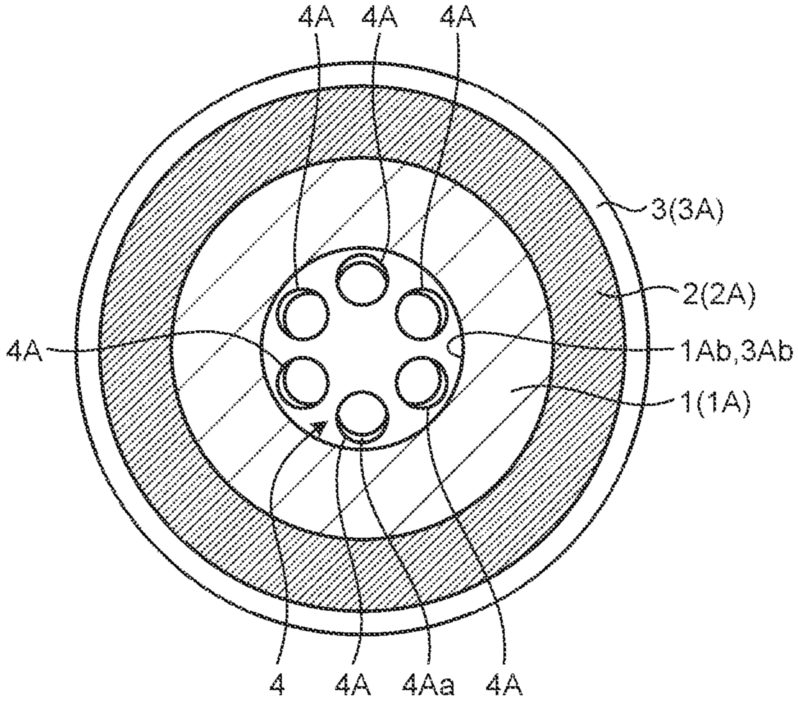
FIG. 9 is a sectional schematic diagram of the nuclear reactor according to the embodiment.
Figure 10:
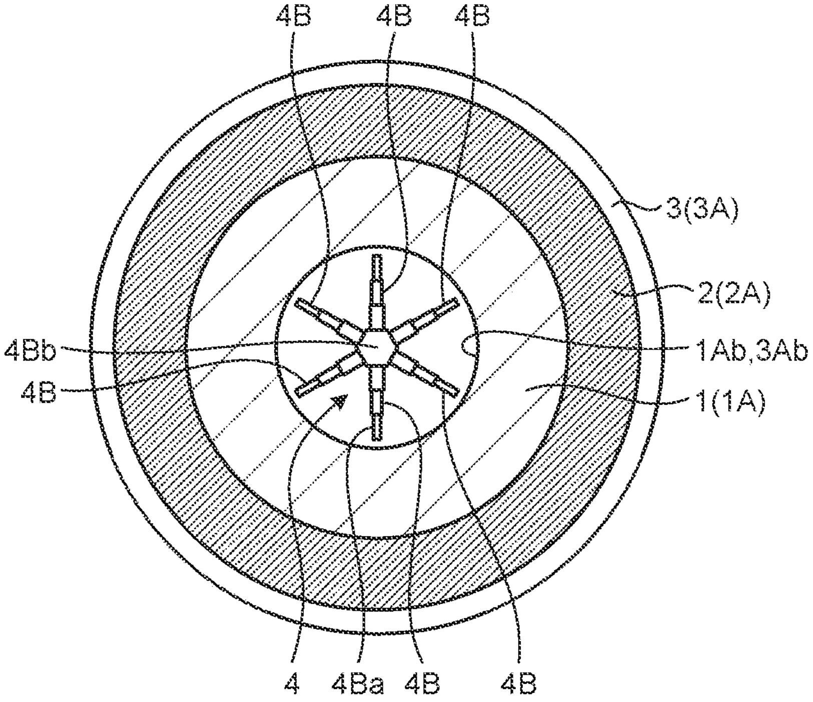
FIG. 10 is a sectional schematic diagram of the nuclear reactor according to the embodiment.
Figure 11:
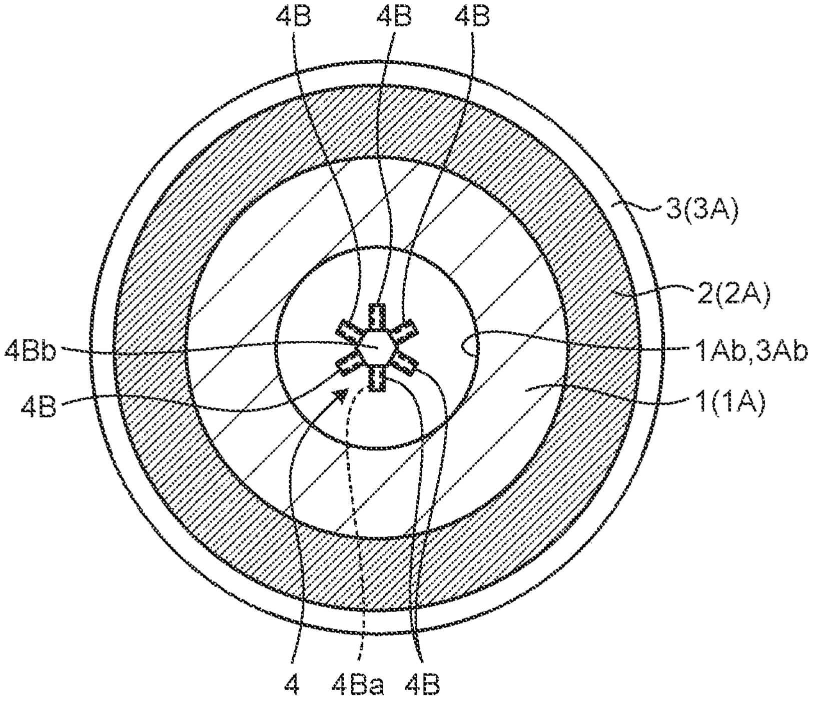
FIG. 11 is a sectional schematic diagram of the nuclear reactor according to the embodiment.
Figure 12:
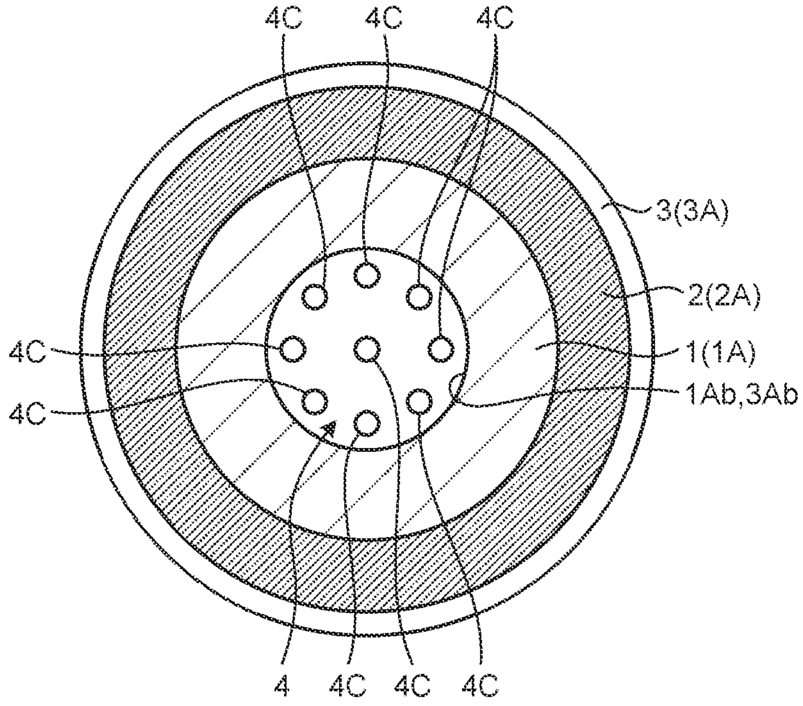
FIG. 12 is a sectional schematic diagram of the nuclear reactor according to the embodiment.

FIG. 2 is a partially cutaway schematic diagram of the nuclear reactor according to the embodiment. FIG. 3 is a sectional schematic diagram of the nuclear reactor according to the embodiment. FIG. 4 is a partially cutaway enlarged schematic diagram of the nuclear reactor according to the embodiment. FIG. 5 is a partially cutaway enlarged schematic diagram of the nuclear reactor according to the embodiment. FIG. 6 is a partially cutaway enlarged schematic diagram of the nuclear reactor according to the embodiment. FIG. 7 is a partially cutaway enlarged schematic diagram of the nuclear reactor according to the embodiment. FIG. 8 is a partially cutaway enlarged schematic diagram of the nuclear reactor according to the embodiment. FIG. 9 is a sectional schematic diagram of the nuclear reactor according to the embodiment. FIG. 10 is a sectional schematic diagram of the nuclear reactor according to the embodiment. FIG. 11 is a sectional schematic diagram of the nuclear reactor according to the embodiment. FIG. 12 is a sectional schematic diagram of the nuclear reactor according to the embodiment.

As illustrated in FIG. 2 to FIG. 5, the nuclear reactor 11 includes a fuel part (a reactor core) 1, a shielding part 2, and the heat conductive part 3.

The fuel part 1 has a fuel layer 1A formed in a plate shape. The fuel layer 1A in the embodiment is formed in a disc shape. The fuel layer 1A has a through hole 1Ab passing across plate-shaped both plate faces 1Aa, to be formed in an annular shape (a ring shape). The through hole 1Ab in the embodiment is formed in a circular shape and is formed at the center of the disc-shaped fuel layer 1A.

As illustrated in FIG. 5, the fuel layer 1A of the embodiment includes nuclear fuels 1B and a support 1C. The support 1C is formed in a disc-ring shape formed by the fuel layer 1A. As the support 1C, graphite can be used as a moderator, for example. The support 1C is formed with a plurality of holes 1Ca passing across the plate-shaped both plate faces 1Aa. In the embodiment, the holes 1Ca are formed in a circular shape. Each nuclear fuel 1B is formed to be housed in each hole 1Ca. In the embodiment, the hole 1Ca is formed in a circular shape, and thus the nuclear fuel 1B is formed in a circular column shape so as to be able to be housed in the hole 1Ca. The nuclear fuel 1B can be formed by sintering uranium powder into the above-described shape, for example. The fuel layer 1A may be formed entirely of the nuclear fuel 1B without having the support 1C.

The shielding part 2 covers the periphery of the fuel part 1. The shielding part 2 is made of a metallic material, for example, and reflects radiation (neutrons) applied from the fuel part 1 (the nuclear fuel 1B), to prevent the radiation from being leaked to the outside covering the fuel part 1. The shielding part 2 may be called a reflector in accordance with the ability of neutron scattering and neutron absorption of the used material. The shielding part 2 has a shielding layer 2A. The shielding layer 2A is formed in a plate shape covering the periphery of the fuel layer 1A along a peripheral face 1Ac of the fuel layer 1A. The shielding layer 2A has a through hole 2Ab passing across plate-shaped both plate faces 2Aa, to be formed in an annular shape (a ring shape). The shielding part 2 houses the fuel layer 1A in the through hole 2Ab.

The heat conductive part 3 has a heat conductive layer 3A formed in a plate shape. The heat conductive layer 3A in the embodiment is formed in a disc shape. The heat conductive layer 3A has a through hole 3Ab passing across plate-shaped both plate faces 3Aa to be formed in an annular shape (a ring shape). The through hole 3Ab in the embodiment is formed in a circular shape and is formed at the center of the disc-shaped heat conductive layer 3A. In the embodiment, the through hole 3Ab is formed in the same shape and the same diameter as those of the through hole 1Ab of the fuel layer 1A so as to match the through hole 1Ab thereof. The heat conductive layers 3A are placed such that their plate faces 3Aa are stacked to be in contact with the plate faces 1Aa of the fuel layers 1A. The stacking direction of the heat conductive layer 3A and the fuel layer 1A is also called an axial direction. The heat conductive layer 3A is formed to have a larger outer diameter than those of the fuel layer 1A and the shielding layer 2A to protrude around the periphery of the fuel layer 1A and the shielding layer 2A. The heat conductive layer 3A of the embodiment is formed in a disc shape and is provided protruding from the entire periphery of the fuel layer 1A and the shielding layer 2A in a radial direction. The radial direction is a direction crossing (orthogonal to) the stacking direction (the axial direction). The heat conductive layer 3A conducts the heat generated by the nuclear reaction of the nuclear fuels 1B of the fuel layer 1A to the outside of the shielding layer 2A through solid heat conduction. For the heat conductive layer 3A, titanium, nickel, copper, or graphite can be used, for example. For graphite, graphene in particular can be used. Graphene has a structure in which hexagonal lattices including carbon atoms and their bonding continue, and the direction in which the hexagonal lattices continue is set to a heat conduction direction, whereby heat conduction efficiency can be improved. The heat conductive layer 3A is provided with a part extending outside the shielding layer 2A so as to be able to perform heat exchange with the coolant inside the nuclear reactor vessel 51.

The fuel layer 1A, the shielding layer 2A, and the heat conductive layer 3A described above constitute a single unit. As illustrated in FIG. 2, a plurality of units are stacked on each other in the axial direction to constitute the nuclear reactor 11. Consequently, in the nuclear reactor 11, the fuel layer 1A, with the shielding layer 2A provided around the periphery thereof, and the heat conductive layer 3A are alternately stacked on each other in the axial direction.

Thus, in the nuclear reactor 11, the fuel part 1 includes a plurality of the fuel layers 1A, and the through holes 1Ab of the fuel layers 1A are aligned in the axial direction to be formed in a tubular shape. The shielding part 2 includes a plurality of the shielding layers 2A and is placed to cover the periphery of the fuel part 1. The shielding part 2 has a lid 2B formed in a plate shape to cover the fuel part 1 provided at each end in the axial direction. The shielding part 2 houses the fuel part 1 in the hermetically sealed inside by the shielding layers 2A and the lids 2B. In housing the fuel part 1 inside, it is preferable that the inside with the hermetically sealed structure be filled with inert gas such as a nitrogen gas for the purpose of preventing oxidation inside. The heat conductive part 3 includes a plurality of the heat conductive layers 3A, in which the heat conductive layers 3A and the fuel layers 1A of the fuel part 1 are alternately stacked on each other in the axial direction, and is provided extending from the inside to the outside of the hermetically sealed shielding part 2.

Consequently, the nuclear reactor 11 of the embodiment can take the heat generated by the nuclear reaction of the nuclear fuels 1B of the fuel part 1 out of the shielding part 2 by solid heat conduction by the heat conductive part 3. The heat having taken out of the shielding part 2 is then conducted to the coolant, which rotates the turbine 55.

The nuclear reactor 11 of the embodiment can take the heat of the nuclear fuels 1B of the fuel part 1 out of the shielding part 2 by solid heat conduction by the heat conductive part 3 (refer to the arrow in FIG. 2) and conduct the heat to the coolant. Consequently, the nuclear reactor 11 of the embodiment can prevent leakage of radioactive materials or the like. In the nuclear reactor 11 of the embodiment, the heat conductive part 3 is placed extending inside the fuel part 1 and outside the shielding part 2 and can thus take the heat of the nuclear fuels 1B of the fuel part 1 out of the shielding part 2 while reducing the heat conduction distance of the heat. Consequently, the nuclear reactor 11 of the embodiment can ensure high output temperature. Although the nuclear reactor 11 of the embodiment describes the heat conductive part 3 in the form of taking out the heat by solid heat conduction, other heat conductive parts in the form of taking out the heat by fluid heat conduction using a heat pipe filled with fluid may be used, for example.

In the nuclear reactor 11 of the embodiment, the fuel layer 1A of the fuel part 1 and the heat conductive layer 3A of the heat conductive part 3 are formed in a plate shape and are placed alternately stacked on each other with the plate faces 1Aa and 3Aa facing each other, and the plate-shaped heat conductive layer 3A is placed with its plate-shaped peripheral part extending outside the shielding part 2. Consequently, the nuclear reactor 11 of the embodiment can be a form in which the heat conductive part 3 is placed passing through the shielding part 2 to extend inside the fuel part 1 and outside the shielding part 2, and the heat of the fuel part 1 can be taken out of the shielding part 2 by solid heat conduction. The plate shape of the fuel layer 1A of the fuel part 1 and the plate shape of the heat conductive layer 3A of the heat conductive part 3 may be changed in plate thickness. Covering the outside of the shielding part 2 from which the heat conductive part 3 does not extend with a heat insulating material can improve the efficiency of heat recovery by the heat conductive part 3.

In the nuclear reactor 11 of the embodiment, the fuel part 1 includes, in the fuel layer 1A, the support 1C formed in a plate shape and the nuclear fuels 1B placed in the holes 1Ca provided in the support 1C. Consequently, the nuclear reactor 11 of the embodiment, in the form of forming the fuel part 1 and the heat conductive part 3 in a plate shape, can place the nuclear fuels 1B as appropriate along the plate face 3Aa of the plate-shaped heat conductive part 3 and can take the heat of the fuel part 1 out of the shielding part 2 by solid heat conduction.

In the nuclear reactor 11 of the embodiment, in the fuel part 1, in the fuel layer 1A, in the form of placing the nuclear fuels 1B in the holes 1Ca provided in the support 1C, it is preferable that the support 1C has a lower density of the holes 1Ca in the area closer to the through hole 1Ab than the density of the peripheral part. That is, in the nuclear reactor 11 of the embodiment, it is preferable that the fuel part 1 has a lower placement density of the nuclear fuels 1B in an area closer to the central part than in the peripheral part. In the configuration of the nuclear reactor 11 of the embodiment, the fuel part 1 has a higher temperature in the central part than in the peripheral part when the placement density of the nuclear fuels 1B is made even. The nuclear reactor 11 of the embodiment is configured to take out heat to the peripheral side, which is the radial direction of the fuel part 1, and to take out the heat easily, the temperature distribution of the nuclear fuels 1B is preferably made even. Thus, in the fuel part 1, the placement density of the nuclear fuels 1B is made lower in the central part than in the peripheral part, whereby the temperature distribution of the nuclear fuels 1B can be made even, and the heat can be taken out easily.

By the way, in the nuclear reactor 11 of the embodiment, as illustrated in FIG. 6, it is preferable that the heat conductive part 3 is formed with a plurality of cutouts 3B in the part of each heat conductive layer 3A extending outside the shielding part 2. The cutouts 3B are formed extending in the radial direction away from the outer face of the shielding part 2 and are formed in a line around the periphery of the heat conductive part 3 along the periphery of the shielding part 2. That is, the heat conductive part 3 is formed with gaps allowing the coolant to pass therethrough by the cutouts 3B in the part extending outside the shielding part 2, the part performing heat exchange with the coolant circulating through the coolant circulating unit 54 in order to perform heat exchange by the heat exchanger 52. Consequently, the nuclear reactor 11 of the embodiment can increase the efficiency of conducting the heat taken out by the heat conductive part 3 to the coolant.

In the heat conductive part 3 formed extending in the radial direction away from the outer face of the shielding part 2, the heat taken out is higher on the inside in the radial direction close to the fuel part 1 and lower on the outside in the radial direction far from the fuel part 1. In FIG. 6, for example, when the heat conductive part 3 formed extending in the radial direction away from the outer face of the shielding part 2 is divided into two regions in the radial direction by an imaginary line L, the temperature of the heat taken out is higher inside the imaginary line L in the radial direction than outside in the radial direction. Given this, in performing heat exchange with the coolant in the heat conductive part 3, the coolant is first passed outside the imaginary line L in the radial direction is then returned and passed inside the imaginary line L in the radial direction, and the coolant is sent out to the heat exchanger 52. In this way, the efficiency of conducting the heat taken out by the heat conductive part 3 to the coolant can be increased.

In the nuclear reactor 11 of the embodiment, as illustrated in FIG. 7, it is preferable that the heat conductive part 3 is passed through by heat conductive tubes 3C through which the coolant is circulated in the part of each heat conductive layer 3A extending outside the shielding part 2. The heat conductive tubes 3C are formed in a line around the periphery of the heat conductive part 3 along the periphery of the shielding part 2. That is, the heat conductive part 3 is passed through by the heat conductive tubes 3C through which the coolant is circulated in the part extending outside the shielding part 2, the part performing heat exchange with the coolant circulating through the coolant circulating unit 54 in order to perform heat exchange by the heat exchanger 52. Consequently, the nuclear reactor 11 of the embodiment conducts the heat taken out by the heat conductive part 3 to the coolant via the heat conductive tubes 3C. The nuclear reactor 11 of the embodiment conducts the heat taken out by the heat conductive part 3 indirectly to the coolant by the heat conductive tubes 3C and can thus maintain radiation blocking performance.

In FIG. 7, for example, when the heat conductive part 3 formed extending in the radial direction away from the outer face of the shielding part 2 is divided into two regions in the radial direction by an imaginary line L, the temperature of the heat taken out is higher inside the imaginary line L in the radial direction than outside in the radial direction. Given these circumstances, the heat conductive tubes 3C are placed in the radial direction and include inner heat conductive tubes 3Ca placed inside the imaginary line L in the radial direction and outer heat conductive tubes 3Cb placed outside the imaginary line L in the radial direction. In performing heat exchange with the coolant in the heat conductive part 3, the coolant is first circulated through the outer heat conductive tubes 3Cb and is then returned and circulated through the inner heat conductive tubes 3Ca, and the coolant is then sent out to the heat exchanger 52. In this way, the efficiency of conducting the heat taken out by the heat conductive part 3 to the coolant can be increased.

In the nuclear reactor 11 of the embodiment, as illustrated in FIG. 8, in the heat conductive part 3, it is preferable that each heat conductive layer 3A is formed in a plate shape by stacking a plurality of plate members 3D on each other in the axial direction overlapping the fuel layer 1A of the fuel part 1. For the heat conductive part 3, graphene can be used, for example. Graphene has a structure in which hexagonal lattices including carbon atoms and their bonding continue and has higher heat conductivity in a direction in which the hexagonal lattices continue. By using this graphene as the sheet-shaped plate members 3D, the hexagonal lattices continue along the faces of the plate members 3D. These plate members 3D are stacked on each other in the axial direction to form a plate shape. The heat conductive part 3 then has higher heat conductivity in the radial direction along the faces of the plate members 3D. Thus, the heat conductive part 3 has higher heat conductivity with respect to the part extending outside the shielding part 2 in the radial direction. Consequently, the nuclear reactor 11 of the embodiment can increase the efficiency of conducting the heat taken out by the heat conductive part 3 to the coolant.

As illustrated in FIG. 9 to FIG. 12, the nuclear reactor 11 of the embodiment includes a control mechanism 4 (4A, 4B, and 4C). The control mechanism 4 is placed inside the annular shape of the fuel layer 1A and inside the tubular shape of the fuel part 1.

The control mechanism 4 illustrated in FIG. 9 is configured as control drums 4A. The control drums 4A are cylindrical and are formed in what is called a drum shape. The control drums 4A are each formed by a cylinder extending in the axial direction of the nuclear reactor 11. The control drums 4A are provided continuously in the axial direction by being inserted through the through holes 1Ab of the fuel layers 1A of the fuel part 1 and the through holes 3Ab of the heat conductive layers 3A of the heat conductive part 3. A plurality of (six in the embodiment) control drums 4A are placed evenly in a circumferential direction, which is around the axial direction of the nuclear reactor 11. The control drums 4A are provided so as to be rotatable around the cylinder. The control drums 4A are each provided with a neutron absorber 4Aa in part of the periphery of the cylinder. The neutron absorber 4Aa is provided at a position at least facing the inner face of the fuel layer 1A, and boron carbide ($B_4C$) can be used, for example. The neutron absorber 4Aa rotates and moves with the rotation of the control drums 4A to move closer to or away from the inner face of the fuel part 1 as the reactor core. When the neutron absorber 4Aa moves closer to the fuel part 1, the reactivity of the fuel part 1 decreases, whereas when the neutron absorber 4Aa moves away from the fuel part 1, the reactivity of the fuel part 1 increases. Thus, the control drums 4A cause the neutron absorber 4Aa to moves close to or away from the fuel part 1 by rotation and can thereby control the reactivity of the fuel part 1 as the reactor core and control the reactor core temperature of the fuel part 1. The reactor core temperature is an average reactor core temperature taken out of the shielding part 2 by the heat conductive part 3. The control drums 4A have a drive unit, which is not illustrated, that drives their rotation. The drive unit is configured such that rotation is urged so that the neutron absorber 4Aa of the control drums 4A moves closer to the inner face of the fuel part 1, and the neutron absorber 4Aa automatically moves closer to the inner face of the fuel part 1 when the coupling with the control drums 4A is cut off by a clutch mechanism or the like. Thus, in an emergency when the temperature of the fuel part 1 becomes a set temperature or higher, for example, the neutron absorber 4Aa can automatically move closer to the inner face of the fuel part 1 to reduce the reactivity of the fuel part 1. The inside of the tubular shape of the fuel part 1, which is around the control drums 4A, may be filled with graphite, for example, as a moderator or may be a space.

The control mechanism 4 illustrated in FIG. 10 and FIG. 11 is configured as control plates 4B. The control plates 4B are formed in a plate shape. The control plates 4B are formed outward in the radial direction from the center of the tubular shape of the fuel part 1. A plurality of (six in the embodiment) control plates 4B are placed evenly in a circumferential direction, which is around the axial direction of the nuclear reactor 11. The control plates 4B are formed extending in the axial direction of the nuclear reactor 11. The control plates 4B are provided so as to be slidable in the radial direction based on a base 4Bb placed extending in the axial direction at the center of the tubular shape of the fuel part 1. The base 4Bb is provided continuously in the axial direction by being inserted through the through holes 1Ab of the fuel layers 1A of the fuel part 1 and the through holes 3Ab of the heat conductive layers 3A of the heat conductive part 3. The control plates 4B are also provided continuously in the axial direction by being inserted through the through holes 1Ab of the fuel layers 1A of the fuel part 1 and the through holes 3Ab of the heat conductive layers 3A of the heat conductive part 3. The control plates 4B may be provided at positions at least facing the inner face of the fuel layer 1A. The control plates 4B of the embodiment are provided so as to be expandable and contractible in the radial direction based on the center of the tubular shape of the fuel part 1. The control plates 4B of the embodiment are provided so as to be expandable and contractible with a structure such as a telescopic mechanism, for example. The control plates 4B are each provided with a neutron absorber 4Ba at least at the tip of the expansion and contraction. For the neutron absorber 4Ba, boron carbide ($B_4C$) can be used, for example. The neutron absorber 4Ba is provided such that it can move in the radial direction with the sliding of the control plates 4B and can moves closer to or away from the inner face of the fuel part 1 as the reactor core. When the neutron absorber 4Ba moves closer to the fuel part 1 (refer to FIG. 10), the reactivity of the fuel part 1 decreases, whereas when the neutron absorber 4Ba moves away from the fuel part 1 (refer to FIG. 11), the reactivity of the fuel part 1 increases. Thus, the control plates 4B cause the neutron absorber 4Ba to move closer to or away from the fuel part 1 by sliding and can thereby control the reactivity of the fuel part 1 and control the reactor core temperature of the fuel part 1. The control plates 4B have a drive unit, which is not illustrated, that drives their sliding. The drive unit urges sliding (extension and contraction) so that the neutron absorber 4Ba of the control plates 4B moves closer to the inner face of the fuel part 1, and the neutron absorber 4Ba automatically moves closer to the inner face of the fuel part 1 when the coupling with the control plates 4B, or drive, is cut off by a clutch mechanism or the like. Thus, in an emergency when the temperature of the fuel part 1 becomes a set temperature or higher, for example, the neutron absorber 4Ba can automatically move closer to the inner face of the fuel part 1 to reduce the reactivity of the fuel part 1. The inside of the tubular shape of the fuel part 1, which is around the control plates 4B and does not interfere with sliding, may be filled with graphite, for example, as a moderator or may be a space.

The control mechanism 4 illustrated in FIG. 12 is configured as control rods 4C. The control rods 4C are formed in a rod shape. The control rods 4C are formed extending in the axial direction of the nuclear reactor 11. The control rods 4C are provided continuously in the axial direction by being inserted through the through holes 1Ab of the fuel layers 1A of the fuel part 1 and the through holes 3Ab of the heat conductive layers 3A of the heat conductive part 3. The control rods 4C are placed at the center of the tubular shape of the fuel part 1, and a plurality of (eight in the embodiment) control rods 4C are placed evenly in a circumferential direction, which is around the center of the tubular shape of the fuel part 1. The control rods 4C are provided so as to be slidable in the axial direction. The control rods 4C are formed of a neutron absorber. For the neutron absorber, boron carbide ($B_4C$) can be used, for example. The control rods 4C formed of the neutron absorber are provided such that they can move closer to or away from the inner face of the fuel part 1 as the reactor core by being moved in the axial direction by sliding and being inserted into the tubular shape of the fuel part 1 or being pulled out of the tubular shape of the fuel part 1. When the control rods 4C move close to the fuel part 1, the reactivity of the fuel part 1 decreases, and when the control rods 4C move away from the fuel part 1, the reactivity of the fuel part 1 increases. Thus, the control rods 4C cause the neutron absorber to move close to or away from the fuel part 1 by sliding and can thereby control the reactivity of the fuel part 1 as the reactor core and control the reactor core temperature of the fuel part 1. The control rods 4C have a drive unit, which is not illustrated, that drives their sliding. The drive unit urges sliding so that the control rods 4C move closer to the inner face of the fuel part 1 and automatically moves closer to the inner face of the fuel part 1 when the coupling with the control rods 4C, or drive, is cut off by a clutch mechanism or the like. Thus, in an emergency when the temperature of the fuel part 1 becomes a set temperature or higher, for example, the control rods 4C can automatically move closer to the inner face of the fuel part 1 to reduce the reactivity of the fuel part 1. The inside of the tubular shape of the fuel part 1, which is around the control rods 4C, may be filled with graphite, for example, as a moderator or may be a space.

As described above, the nuclear reactor 11 of the embodiment includes the annular fuel layer 1A and the heat conductive layer 3A stacked on the fuel layer 1A and extending around the periphery of the fuel layer 1A.

In the nuclear reactor 11 of the embodiment, the fuel part 1 is formed in a tubular shape. With this structure, the nuclear reactor 11 of the embodiment can reduce the temperature difference between the central part and the peripheral surface part of the fuel part 1 as the reactor core compared to a case in which it is formed in a columnar shape, which is not tubular. With this effect, the surface temperature can be set higher than that of a non-tubular structure. The higher surface temperature of the nuclear reactor 11 improves the thermal output and can improve the power generation efficiency in the nuclear power generation system 50.

In the nuclear reactor 11 of the embodiment, the thermal output of the fuel layer 1A constituting the reactor core is output to the outside of the reactor core via the heat conductive layer 3A. When a reactor core inlet temperature to be conducted to the heat conductive layer 3A is constant, the total amount of heat delivered is determined by a contact area between the heat conductive layer 3A and a member to which heat is conducted by being in contact with the heat conductive layer 3A. Thus, the nuclear reactor 11 of the embodiment can change the reactor core thermal output by increasing or decreasing the number of layers stacked of the fuel layers 1A and the heat conductive layers 3A.

In the nuclear reactor 11 of the embodiment, the fuel layer 1A and the heat conductive layer 3A are preferably configured as a single unit, and a plurality of such units are preferably stacked on each other. In increasing or decreasing the number of stacked layers of the fuel layers 1A and the heat conductive layers 3A, by forming the fuel layer 1A and the heat conductive layer 3A as single a unit, the nuclear reactor 11 of the embodiment can easily change the reactor core thermal output.

The nuclear reactor 11 of the embodiment preferably includes the control mechanism 4 placed inside the annular shape of the fuel layer 1A. By placing the control mechanism 4 inside the annular shape of the fuel layer 1A, the nuclear reactor 11 of the embodiment can reduce the overall size compared to placing the control mechanism 4 around the periphery of the fuel part 1 as the reactor core. In addition, compared to the case in which the control mechanism 4 is placed around the periphery of the fuel part 1 as the reactor core, the nuclear reactor 11 of the embodiment can reduce (thin) the barrier of the heat conductive layer 3A extending around the periphery of the fuel layer 1A and set the surface temperature of the nuclear reactor 11 higher.

In the nuclear reactor 11 of the embodiment, the control mechanism 4 can cause the neutron absorber to move closer to or away from the inner face of the fuel layer 1A by rotation. Consequently, in the nuclear reactor 11 of the embodiment, the control mechanism 4 can be configured as the control drums 4A.

In the nuclear reactor 11 of the embodiment, the control mechanism 4 can cause the neutron absorber to move closer to or away from the inner face of the fuel layer 1A by sliding in the radial direction. Consequently, in the nuclear reactor 11 of the embodiment, the control mechanism 4 can be configured as the control plates 4B.

In the nuclear reactor 11 of the embodiment, the control mechanism 4 can insert or remove the neutron absorber in the axial direction into or from the annular shape of the fuel layer 1A. Consequently, in the nuclear reactor 11 of the embodiment, the control mechanism 4 can be configured as the control rods 4C.

In the nuclear reactor 11 of the embodiment, two or more heat conductive layers 3A having different diameters can be included. The heat conductive layer 3A is stacked on the fuel layer 1A, and when there are a plurality of heat conductive layers 3A, their outer diameters can be made different from each other. Consequently, the nuclear reactor 11 of the embodiment can change the amount of extension (the extension length) of the heat conductive layer 3A extending around the periphery of the fuel layer 1A and can thus impart flexibility to the design of thermal output.

In the nuclear reactor 11 of the embodiment, the fuel layer 1A is preferably provided with uranium enrichment distribution in the radial direction. In the nuclear reactor 11 of the embodiment, as an example, the fuel layer 1A is in the form of placing the nuclear fuels 1B in the holes 1Ca provided in the support 1C. Consequently, by changing the density of the holes 1Ca of the support 1C, the distribution of the nuclear fuels 1B, that is, the uranium enrichment distribution can be changed. The fuel layer 1A has a higher temperature in the central part than in the peripheral part when the uranium enrichment distribution is made even in the radial direction. The nuclear reactor 11 of the embodiment has a configuration in which heat is taken out of the periphery of the fuel layer 1A by the heat conductive layer 3A. In order to take out the heat easily, the temperature distribution is preferably made even in the radial direction. Thus, the central part of the fuel layer 1A is made lower than the peripheral part thereof such that the uranium enrichment distribution is provided in the radial direction, whereby the temperature distribution in the radial direction can be made even, and the heat can be taken out easily.

In the nuclear reactor 11 of the embodiment, the heat conductive layer 3A preferably conducts the heat of the fuel layer 1A to the outside by solid heat conduction. The nuclear reactor 11 of the embodiment conducts the heat of the fuel layer 1A to the outside by solid heat conduction and can thereby take out the heat while preventing radiation leakage and can ensure a high output temperature.

REFERENCE SIGNS LIST

1A Fuel layer
3A Heat conductive layer
4 Control mechanism
4A Control drum
4B Control plate
4C Control rod
11 Nuclear reactor

The invention claimed is:

1. A nuclear reactor comprising:
an annular fuel layer includes a support with a through hole formed at the center of a disc shape, and nuclear fuel stored within the surface of the support;
a heat conductive layer stacked on the fuel layer, in contact with the circular surface of the disc shape of the support, and extending outward in the radial direction of the disc shape of the support beyond the fuel layer; and
a shielding part that covers the outer periphery of the fuel layer and forms a hermetically sealed space around the area where the fuel layer is placed;
wherein the heat conductive layer protrudes partially from the interior of the shielding portion and transmits heat generated in the fuel layer to the exterior of the shielding portion only by solid heat conduction.

2. The nuclear reactor according to claim 1, wherein the fuel layer and the heat conductive layer are formed as a single unit, and a plurality of the units are stacked on each other.

3. The nuclear reactor according to claim 1, further comprising a control mechanism including a neutron absorber disposed in the through hole of the support and controlling the position of a neutron absorber.

4. The nuclear reactor according to claim 3, wherein the control mechanism rotates the neutron absorber to change the distance between it and the nuclear fuel.

5. The nuclear reactor according to claim 3, wherein the control mechanism causes a neutron absorber to move in the radial direction to change the distance between the neutron absorber and the nuclear fuel.

6. The nuclear reactor according to claim 3, wherein the control mechanism moves the neutron absorber in the axial direction of the through hole of the support.

7. The nuclear reactor according to claim 1, wherein the heat conductive layer has a radial length of the heat conduction portion that is different from at least one other unit's heat conduction layer.

8. The nuclear reactor according to claim 1, wherein the fuel layer is formed by forming a plurality of holes in the support body, and the nuclear fuel is arranged in each of the holes.

* * * * *